(12) United States Patent
Peterson et al.

(10) Patent No.: US 8,949,708 B2
(45) Date of Patent: Feb. 3, 2015

(54) WEB-BASED ELECTRONICALLY SIGNED DOCUMENTS

(75) Inventors: Donald G. Peterson, Kirkland, WA (US); Duane E. Wald, Kent, WA (US); Mike Borozdin, San Francisco, CA (US)

(73) Assignee: DocuSign, Inc., Seattle, WA (US)

( * ) Notice: Subject to any disclaimer, the term of this patent is extended or adjusted under 35 U.S.C. 154(b) by 88 days.

(21) Appl. No.: 13/158,937

(22) Filed: Jun. 13, 2011

(65) Prior Publication Data

US 2011/0314371 A1 Dec. 22, 2011

Related U.S. Application Data

(60) Provisional application No. 61/354,155, filed on Jun. 11, 2010.

(51) Int. Cl.
G06F 17/21 (2006.01)
G06F 21/64 (2013.01)

(52) U.S. Cl.
CPC ...... *G06F 21/645* (2013.01); *G06F 2221/2115* (2013.01); *G06F 2221/2119* (2013.01)
USPC ....................................................... 715/234

(58) Field of Classification Search
CPC ... G06F 3/1208; G06F 21/33; G06F 21/6209; G06F 21/64; G06Q 10/10; H04L 9/3247; H04L 43/16
USPC ....................................................... 715/234
See application file for complete search history.

(56) References Cited

U.S. PATENT DOCUMENTS

| | | |
|---|---|---|
| 5,040,142 A | 8/1991 | Mori et al. |
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |

(Continued)

FOREIGN PATENT DOCUMENTS

| | | |
|---|---|---|
| CN | 101299256 | 11/2008 |
| EP | 1238321 | 6/2001 |

(Continued)

OTHER PUBLICATIONS

Laurens Leurs; The history of PDF; Feb. 14, 2010; Prepressure.com; pp. 1-12.*

(Continued)

*Primary Examiner* — Andrew Dyer
(74) *Attorney, Agent, or Firm* — Lowe Graham Jones PLLC

(57) ABSTRACT

Techniques for electronic signature process management are described. Some embodiments provide an electronic signature service ("ESS") configured to manage electronic signature processes represented by way of templates. In some embodiments, the ESS transmits a URL or other identifier of a template that specifies required electronic signature data, such as a singer name and/or signature. Then, the ESS dynamically prepares a form based on a received request for the identified template. Next, the ESS receives the electronic signature data by causing the form to be presented by a Web browser or other client. In some embodiments, the ESS and associated client systems perform these techniques without use of a Portable Document Format processing module.

19 Claims, 17 Drawing Sheets

(56) References Cited

U.S. PATENT DOCUMENTS

| | | |
|---|---|---|
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 * | 2/2001 | Bernardo et al. ............ 715/234 |
| 6,185,683 B1 | 2/2001 | Ginter et al. |
| 6,199,052 B1 | 3/2001 | Mitty et al. |
| 6,210,276 B1 | 4/2001 | Mullins |
| 6,237,096 B1 | 5/2001 | Bisbee et al. |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,446,115 B2 * | 9/2002 | Powers ........................ 709/206 |
| 6,470,448 B1 | 10/2002 | Kuroda et al. |
| 6,584,466 B1 | 6/2003 | Serbinis et al. |
| 6,615,348 B1 | 9/2003 | Gibbs |
| 6,658,403 B1 | 12/2003 | Kuroda et al. |
| 6,671,805 B1 | 12/2003 | Brown et al. |
| 6,728,762 B1 | 4/2004 | Estrada et al. |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 | 10/2005 | Kinnis et al. |
| 6,961,854 B2 | 11/2005 | Serret-Avila et al. |
| 6,973,569 B1 | 12/2005 | Anderson et al. |
| 6,990,684 B2 * | 1/2006 | Futamura et al. ............... 726/18 |
| 7,039,805 B1 | 5/2006 | Messing |
| 7,059,516 B2 * | 6/2006 | Matsuyama et al. .......... 235/382 |
| 7,069,443 B2 | 6/2006 | Berringer et al. |
| 7,093,130 B1 | 8/2006 | Kobayashi et al. |
| 7,100,045 B2 | 8/2006 | Yamada et al. |
| 7,103,778 B2 * | 9/2006 | Kon et al. ..................... 713/185 |
| 7,162,635 B2 | 1/2007 | Bisbee et al. |
| 7,167,844 B1 | 1/2007 | Leong et al. |
| 7,197,644 B2 | 3/2007 | Brewington |
| 7,237,114 B1 | 6/2007 | Rosenberg |
| 7,340,608 B2 | 3/2008 | Laurie et al. |
| 7,360,079 B2 | 4/2008 | Wall |
| 7,395,436 B1 | 7/2008 | Nemovicher |
| 7,424,543 B2 * | 9/2008 | Rice, III ....................... 709/229 |
| 7,437,421 B2 * | 10/2008 | Bhogal et al. ................. 709/206 |
| 7,523,315 B2 | 4/2009 | Hougaard et al. |
| 7,533,268 B1 | 5/2009 | Catorcini et al. |
| 7,554,576 B2 | 6/2009 | Erol et al. |
| 7,562,053 B2 | 7/2009 | Twining et al. |
| 7,568,101 B1 | 7/2009 | Catorcini et al. |
| 7,568,104 B2 | 7/2009 | Berryman et al. |
| 7,581,105 B2 | 8/2009 | Dietl |
| 7,657,832 B1 | 2/2010 | Lin |
| 7,660,863 B2 * | 2/2010 | De Boursetty et al. ....... 709/207 |
| 7,788,259 B2 * | 8/2010 | Patterson et al. ............. 707/726 |
| 7,934,098 B1 | 4/2011 | Hahn et al. |
| 7,953,977 B2 * | 5/2011 | Maruyama et al. ........... 713/170 |
| 8,103,867 B2 | 1/2012 | Spitz |
| 8,132,013 B2 | 3/2012 | Meier |
| 8,286,071 B1 | 10/2012 | Zimmerman et al. |
| 8,588,483 B2 | 11/2013 | Hicks et al. |
| 8,612,349 B1 | 12/2013 | Ledder et al. |
| 2001/0018739 A1 | 8/2001 | Anderson et al. |
| 2001/0034835 A1 * | 10/2001 | Smith ........................... 713/175 |
| 2002/0004800 A1 | 1/2002 | Kikuta et al. |
| 2002/0019937 A1 | 2/2002 | Edstrom et al. |
| 2002/0026427 A1 * | 2/2002 | Kon et al. ........................ 705/67 |
| 2002/0026582 A1 | 2/2002 | Futamura et al. |
| 2002/0040431 A1 * | 4/2002 | Kato et al. .................... 713/168 |
| 2002/0069179 A1 | 6/2002 | Slater et al. |
| 2002/0069358 A1 | 6/2002 | Silvester |
| 2002/0129056 A1 | 9/2002 | Conant et al. |
| 2002/0138445 A1 | 9/2002 | Laage et al. |
| 2002/0143711 A1 | 10/2002 | Nassiri |
| 2002/0162000 A1 | 10/2002 | Benzler |
| 2002/0178187 A1 * | 11/2002 | Rasmussen et al. ........... 707/513 |
| 2002/0184485 A1 | 12/2002 | Dray et al. |
| 2002/0194219 A1 | 12/2002 | Bradley et al. |
| 2002/0196478 A1 | 12/2002 | Struble |
| 2003/0048301 A1 * | 3/2003 | Menninger ................... 345/764 |
| 2003/0051016 A1 * | 3/2003 | Miyoshi et al. .............. 709/222 |
| 2003/0078880 A1 | 4/2003 | Alley et al. |
| 2003/0120553 A1 | 6/2003 | Williams |
| 2003/0120930 A1 | 6/2003 | Simpson et al. |
| 2003/0131073 A1 * | 7/2003 | Lucovsky et al. ............. 709/219 |
| 2003/0140252 A1 * | 7/2003 | Lafon et al. .................. 713/201 |
| 2003/0217275 A1 | 11/2003 | Bentley et al. |
| 2004/0054606 A1 | 3/2004 | Broerman |
| 2004/0078337 A1 | 4/2004 | King et al. |
| 2004/0107352 A1 | 6/2004 | Yui et al. |
| 2004/0117627 A1 | 6/2004 | Brewington |
| 2004/0133493 A1 | 7/2004 | Ford et al. |
| 2004/0181756 A1 | 9/2004 | Berringer et al. |
| 2004/0225884 A1 | 11/2004 | Lorenzini et al. |
| 2004/0230891 A1 * | 11/2004 | Pravetz et al. ................ 715/511 |
| 2004/0250070 A1 | 12/2004 | Wong |
| 2004/0255114 A1 | 12/2004 | Lee et al. |
| 2004/0255127 A1 | 12/2004 | Arnouse |
| 2005/0033811 A1 | 2/2005 | Bhogal et al. |
| 2005/0049903 A1 * | 3/2005 | Raja ................................. 705/7 |
| 2005/0076215 A1 | 4/2005 | Dryer |
| 2005/0091143 A1 | 4/2005 | Schmidt et al. |
| 2005/0120217 A1 | 6/2005 | Fifield et al. |
| 2005/0165626 A1 | 7/2005 | Karpf |
| 2005/0182684 A1 | 8/2005 | Dawson et al. |
| 2005/0182956 A1 * | 8/2005 | Ginter et al. .................. 713/193 |
| 2005/0192908 A1 * | 9/2005 | Jorimann et al. ............... 705/67 |
| 2005/0231738 A1 | 10/2005 | Huff et al. |
| 2006/0047600 A1 * | 3/2006 | Bodenheim et al. ............ 705/40 |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 * | 12/2006 | Kawabe et al. ............... 707/200 |
| 2007/0026927 A1 | 2/2007 | Yaldoo et al. |
| 2007/0079139 A1 | 4/2007 | Kim |
| 2007/0088958 A1 | 4/2007 | Qa'Im-maqami |
| 2007/0118732 A1 | 5/2007 | Whitmore |
| 2007/0130186 A1 * | 6/2007 | Ramsey et al. ............... 707/101 |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 * | 6/2008 | Ginter et al. .................. 713/175 |
| 2008/0209313 A1 | 8/2008 | Gonser |
| 2008/0209516 A1 | 8/2008 | Nassiri |
| 2008/0216147 A1 * | 9/2008 | Duffy ............................... 726/1 |
| 2008/0235577 A1 | 9/2008 | Veluchamy et al. |
| 2008/0260287 A1 | 10/2008 | Berryman et al. |

(56) References Cited

U.S. PATENT DOCUMENTS

| | | |
|---|---|---|
| 2008/0313723 A1 | 12/2008 | Naono et al. |
| 2009/0024912 A1* | 1/2009 | McCabe et al. ............... 715/224 |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1* | 9/2010 | Ashton et al. ............... 715/253 |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1* | 5/2011 | Sieberer ..................... 713/180 |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |

FOREIGN PATENT DOCUMENTS

| | | |
|---|---|---|
| JP | 2000048072 | 2/2000 |
| JP | 2003271529 | 9/2003 |
| JP | 2005267438 | 9/2005 |
| JP | 2008117258 | 5/2008 |
| JP | 2008225527 | 9/2008 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | 03091834 | 11/2003 |
| WO | 2007075235 | 7/2007 |
| WO | 2008124627 | 10/2008 |
| WO | 2009012478 | 1/2009 |
| WO | 2010105262 | 9/2010 |

OTHER PUBLICATIONS

Wheeler et al., "DocuSign Unveils new Scalable Product and Support Offerings of Electronic Signature and Electronic Contract Execution," DocuSign the Fastest Way to Get a Signature, 2 pp., Jan. 2008.

Borozdin, "DocuSign Connect Service Guide," DocuSign, Inc., pp. 1-9, 2008.

eLynx Adds Workflow Management to Electronic Document Platform—new Workflow Capabilities Provide for Enhanced Electronic Loan Processing, eLynx, http://www.elynx.com/news/view/82, 2 pp. Jan. 2009.

Brown, "Digital Signatures: Can They Be Accepted as Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

Su et al., "Signature-In-Signature Verification via a Secure Simple Network Protocol", 2010, IEEE, p. 1-4.

Zefferer et al., "An Electronic-Signature Based Circular Resolution Database System," Mar. 2010, ACM, p. 1840-1845.

Kamara et al.,"Cryptographic Cloud Storage", Financial Cryptography and Data Security, 2010, pp. 136-149.

Harold, Elliotte Rusty, XML Bible. IDG Books Worldwide, Inc., 1999, p. 191-192.

* cited by examiner

*Fig. 4B*

Add DocuSign Template

Select: (Template Library)

If you wish to use a Desktop Template click here.

| Del. | Template Name |
|---|---|
| X | DocuSign PTO Request Form |

Sender

Sender Name: Grant Peterson    Change

Usage Settings

Maximum number of times the document can be used:
☐ Uses remaining: [    ]

Frequency the same signer can use the document:
☐ Limit use to every [    ] (Minutes ▶)

Document Status (Active ▶)

Signing Mode (Direct ▶)

Recipients

| Routing Order | Role or Name | Email | Type | Access Code | Id Check |
|---|---|---|---|---|---|
| 1 | Employee | | Signer | | False |
| 2 | Direct Manager | | Signer | | False |
| 3 | Employee | | Signer | | False |
| 4 | Matt Marquez (Role: Payroll) | matt@docusign.com | CertifiedDelivery | | False |

Document Settings

Document Name: [Docusign PTO Request Form]

Email Subject: [Request for Paid Time Off]

Email Text: [Please review and approve my PTO request. Thank You.]

Signing Instructions: [    ]
(maximum 2000 characters)

(Save)

*Fig. 4C*

PowerForms Library

Documents

New PowerForm

| Name (Template) | Sender | Auth | Used | Remaining | Last Used | Status | Type |
|---|---|---|---|---|---|---|---|
| ☐ DocuSign PTO Request Form | Grant Peterson | Direct | 0 | Unlimited | Not Used | Active | Web |

( Form Data ) ( Download ) ( Email ) ( Links ) ( Edit ) ( Replace Template ) ( Copy ) ( Delete )

Fig. 4D

PowerForms Library

Documents

New PowerForm

| | Name (Template) | Sender | Auth | Used | Remaining | Last Used | Status | Type |
|---|---|---|---|---|---|---|---|---|
| ☐ | DocuSign PTO Request Form | Grant Peterson | Direct | 0 | Unlimited | Not Used | Active | Web |

[Form Data] [Download] [Email] [Links] [Edit] [Replace Template] [Copy] [Delete]

Links

Document: DocuSign PTO Request Form

URL: https://test.docusign.net/MEMBER/PowerFormSigning.aspx?PowerFormId=19409fb4-816b-4ace-96f3-067c924c3d77

HTML: `<a href='https://test.docusign.net/MEMBER/PowerFormSigning.aspx?PowerFormId=19409fb4-816b-4ace-96f3-067c924c3d77'/>DocuSign PTO Request Form</a>`

[Close]

*Fig. 4E*

DocuSign TeamSite Home > Human Resources
HR policies, forms and benefit information

Announcements

DocuSign Employee Phone Directory     6/8/2010 11:07 AM
By Jamie Byrnes

DocuSign Core Values     5/18/2010 1:33 PM
By Lynda Mills

How to Enroll in the 401(k) Plan     1/19/2010 10:16 AM
By Ken Moyle

Account Access
You may access your account and conduct transactions 24 hours a day, 7 days a week at www.mykplan.com. Use your SSN as your login ID, and the last 4 digits of your SSN as your password. The plan number is 671282. You may speak ...

ADDITIONAL SPECIAL ENROLLMENT RIGHTS IN THE DOCUSIGN, INC. GROUP HEALTH PLAN     11/2/2009 2:34 PM
By Ken Moyle
Under the recently enacted Children's Health Insurance Program Reauthorization Act of 2009 (the "Act"), effective April 1, 2009, there are two new special enrollment opportunities to enroll in your group health plan through DocuSign. DocuSign's group ...

2009-2010 Benefits Presentation     8/28/2009 3:11 PM
By Ken Moyle
If you missed our benefits presentations during open enrollment week (Aug. 24-28), here are the slides from the meeting.

(More announcements ...)

Add new announcement

Calendar

There are currently no upcoming events. To add a new efent click "Add new event" below.
Add new event

Fig. 4F

Instructions
In order to being the signing process, please provide your name and email If there are other 'roles' required for this document to be completed, please enter the name and email of these other recipients. An email will be sent inviting them to sign along with you.

PowerForm Signer Information

Please enter your name and email to begin the signing process

Your Role: Employee *

Your Name: Grant Peterson

Your Email: grant.peterson@docusign.com

Please provide information for any other signers needed for this document.

Role: Direct Manager

Name: Steve King

Email: Steve.king@docusign.com ( Begin Signing )

Fig. 4G

REQUEST FOR TIME OFF

To: _____ (Hiring Manager email)

From: Grant Peterson

Signature: [Sign Here ▶]

Dates request submitted: 6/10/2010

I am requesting your approval for the following time away from work:

Dates: [6/01/2010]   [6/02/2010]

I will be using:
[16 ▶] Hours Regular PTO   [0 ▶] Hours Floating Holiday
[0 ▶] Compensatory Time (provide details below)

Comments: [Attend a family wedding]

APPROVED

Manager Signature/Date: _____

Add DocuSign Template

Select: [ Template Library ]

If you wish to use a DocuSign Professional template click here.

Sender

Sender Name: Steve Anderson     Change

Usage Settings

Maximum number of times the document can be used:
☐ Uses remaining: [   ]

Frequency the same signer can use the document:
☐ Limit use to every [   ] [ Minutes ▶ ]

Document Status  [ Active ▶ ]

Signing Mode  [ Email ▶ ]

Recipients

Routing   Role or Name   Email         Type   Access   Id
Order                                         Code     Check

Document Settings

Document Name: [                    ]

Email Subject: [ Please review & sign your document. ]

Email Text:
Please review & sign your document.
To begin the process of reviewing and signing your documents, please click the button below. Signing will not be completed until you have reviewed the agreement and you have confirmed your signature.

Signing Instructions: [                    ]

(maximum 2000 characters)

( Save )

*Fig. 4H*

Recipients

| Routing Order | Role or Name | Email | Type | Access Code | Id Check |
|---|---|---|---|---|---|
| 1 | Signer 1 | | Signer | | False |
| 2 | Steve Anderson (Role: Legal) | steve.anderson_ds@yahoo.com | Signer | | False |

Fig. 4I

Document Settings

Document Name: Prom Note

Email Subject: Kaplan Promissory Note

Email Text: Congratulations on enrolling in a Kaplan Continuing Education (KCE) certificate program. Please click "Review" below to complete and e-sign the required financial form as soon as possible, in order to access the online classroom and begin your study program.

Thank you and good luck!

(maximum 2000 characters)

Signing Instructions:

WEB-BASED ELECTRONICALLY SIGNED DOCUMENTS

PRIORITY CLAIM

This application claims the benefit of U.S. Provisional Application Ser. No. 61/354,155 filed Jun. 11, 2010, the contents of which are incorporated by reference.

FIELD OF THE INVENTION

The present disclosure relates to methods and systems for electronic signatures and, more particularly, to methods and systems for managing Web-based electronic signature processes.

BACKGROUND OF THE INVENTION

In one approach to managing an electronic signature process, a document is emailed or otherwise transferred to a user (a "signer") who engages in a signature process with respect to the document. Upon receipt, the signer signs the document, after which data from the signed document is transferred to a server or other location for storage.

The above-described approach suffers from a number of drawbacks. First, common implementations of this approach typically require specialized software, such as Portable Document Format ("PDF") processing software. Moreover, the PDF processing software often needs to be specially configured to facilitate the signature process. Second, PDF and its related processing software may suffer from security vulnerabilities that can be exploited by malicious parties for various purposes, thereby rendering the signature process unreliable. Third, such an approach typically statically defines the document for signature such that the document cannot easily be modified in light of newly received information, particularly when the document has been previously sent to the signer.

SUMMARY OF THE INVENTION

In one embodiment, a method in an electronic signature service for facilitating electronic signatures includes, without use of a PDF processing module, transmitting a URL or other identifier that identifies a template that specifies required electronic signature data; receiving a request based on the transmitted URL; in response to the received request, preparing a form based on the template; presenting the form within a Web browser; and receiving the required electronic signature data.

In other embodiments, systems and computer-readable media for facilitating electronic signatures by an electronic signature service are provided.

In further embodiments, client side methods, systems, and computer-readable media for interacting with an electronic signature service are provided.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based methods and systems for obtaining and managing electronic signatures and, more particularly, for creating, managing, and utilizing a dynamic Web-based electronic signature process. Example embodiments provide an electronic signature service ("ESS") configured to facilitate creation of a template that specifies required electronic signature data. In one embodiment, the electronic signature service is further configured to provide an identifier of the template, such as a uniform resource locator ("URL"), a uniform resource identifier ("URI"), a network file identifier or path, or the like. This identifier can be provided to a signer in various ways, such as by being placed on a Web page for access by a Web browser operated by the signer. When the ESS later receives a request based on the provided identifier, the ESS dynamically prepares a form based on the template. This form is transmitted to the signer, who in turn uses it to provide the required electronic signature data to the ESS. The ESS stores the provided electronic signature data for use by other components or parties.

Figure 1:
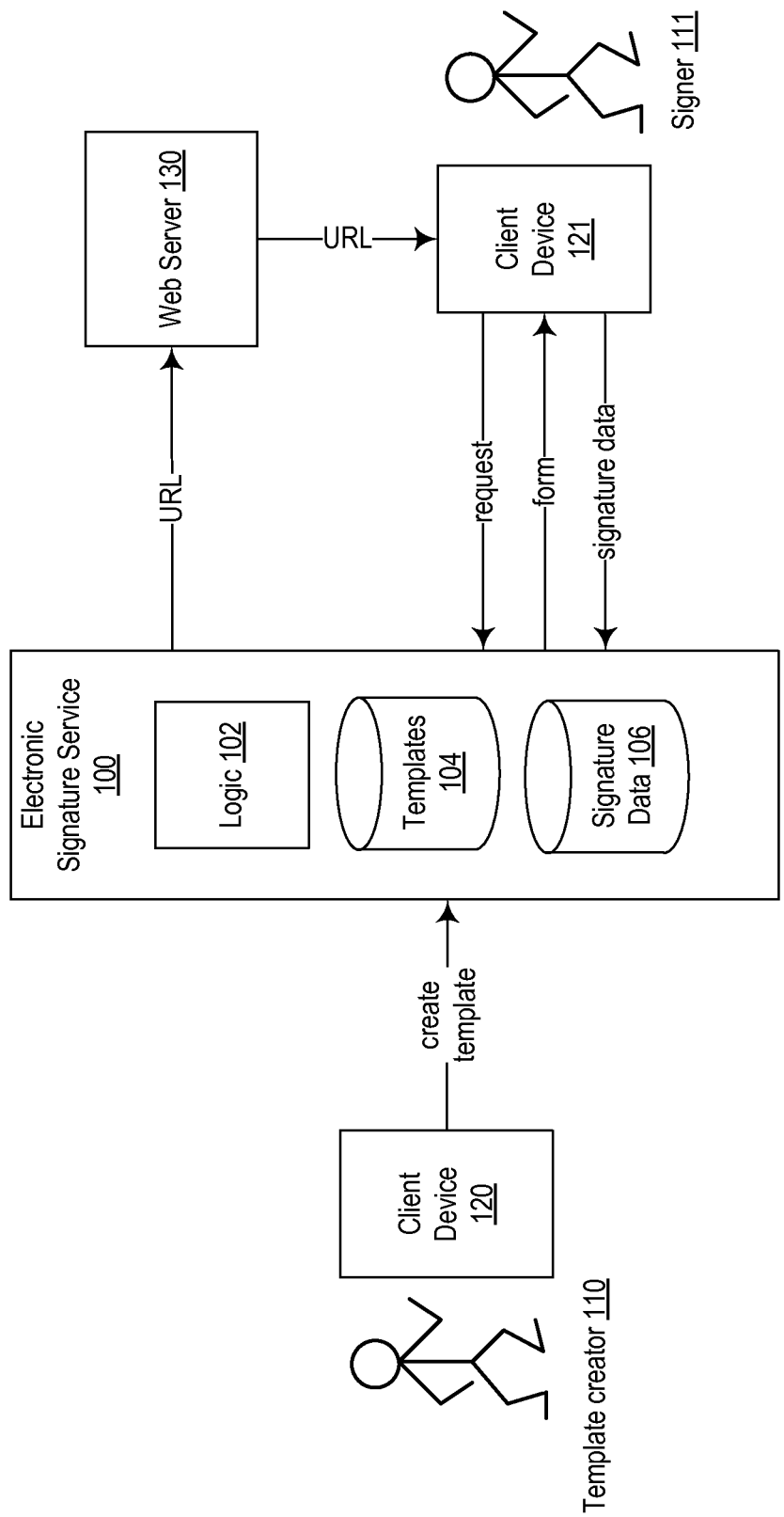
FIG. 1 illustrates an exemplary block diagram of an embodiment of an electronic signature service in accordance with the present invention.

FIG. 1 illustrates an exemplary block diagram of an example embodiment of an ESS in accordance with the present invention. In particular, FIG. 1 illustrates an ESS 100 that includes logic 102, a templates data repository 104 and a signature data repository 106.

A template creator user 110 uses a client device 120 (e.g., a personal computer, a laptop computer, a smart phone) to create a template. The created template specifies, indicates, or identifies required electronic signature data, such as a signer name, a signature, a date, and the like. Template creation in one example embodiment is described further with reference to FIGS. 4A-4N, below. The created template is stored by the ESS 100 in the templates data repository 104.

In the illustrated example, the ESS 100 provides a uniform resource locator ("URL") to a Web server 130. The Web server 130 hosts Web pages and/or code modules (e.g., server and/or client side code, servlets, plug-ins, scripts) that facilitate transactions that require electronic signatures. For example, the Web server 130 may host a human resources Web site that facilitates requests for or related to personal time off, vacation time, sick leave, retirement account contributions, and other personnel matters. In other embodiments, the Web server 130 may host an online shopping facility, an online banking service, a government service, or the like.

A signer user 111 uses a client device 121 (e.g., a personal computer, a laptop computer, a smart phone) to perform a transaction facilitated by the Web server 130. For example, the signer user 111 may use the client device 121 to submit a request for personal time off to the Web server 130. In response, the Web server transmits the URL that identifies the template to the client device 121. The transmitted URL may be embedded in a Web page as a link or other element (e.g., button).

The client device 121 then transmits a request based on the received URL to the ESS 100. In one embodiment, the request is transmitted via HTTP, HTTPS, or some other protocol specified by the URL. The transmitted request may include all or some of the URL (e.g., the hierarchical portion of the URL including a host name and path name) as well as data obtained by the client device 121 and/or the Web server 130. For example the client device 121 may initially present a form to gather or obtain data from the signer 111, such as a name, address, employee identification number, or other information. This obtained data may be incorporated or included as part of the transmitted request. In one embodiment, the obtained data is appended onto the URL (or portion thereof) as a query string (e.g., as in an HTTP GET request) or other type of parameters (e.g., embedded in the request as HTTP POST data).

In response to the request received from the client device 121, the ESS 100 dynamically prepares a form based on the request and/or the template identified by the request. The form may include or otherwise be customized based on additional data appended to the URL or otherwise transmitted along with the received request as discussed above. For example, if the signer's name and address were appended to the URL, then the form may be customized to include this information, thereby saving the signer 111 the steps of having to re-enter this information during the signature process. The prepared form may be, include, or specify user interface controls that are configured to obtain the required signature data from the signer 111. The prepared form is transmitted to the client device 121, where it is presented to the signer 111, such as within the context of a Web browser or other client application. The signer 111 then provides the required signature data via the prepared form to the ESS 100.

The ESS 100 then stores the received required signature data in the signature data repository 106. The required signature data is then made available for access by other components or users. For example the template creator 110 or some other administrative user (e.g., a human resources administrator) can access the required signature data to verify that the signer 111 has provided the required electronic signature.

In at least some embodiments, the techniques described herein do not require the use of a Portable Document Format ("PDF") processing module (e.g., viewer, reader, editor) by any of the elements involved in a signature process. In the example of FIG. 1, neither the client devices 120-121 nor the ESS 100 have or utilize a PDF module to perform any of the described acts or functions. In particular, the client device 121, in obtaining the required signature data does not use a PDF module (e.g., to present and/or fill out a form). Instead, the client device 121 receives and renders the form only via well-known Web standards, such as HTTP, HTML, and the like. By not relying on the PDF format or related processing modules, the described approaches can advantageously be deployed in environments where PDF processing modules may not be available or configured to facilitate form-filling operations or the like, including feature phone or smart phone settings where PDF support may be minimal or entirely lacking.

Also, the techniques described herein can be employed to overcome or avoid problems related to "stale" or inconsistent forms. In prior approaches, forms may become stale or inconsistent with one another or associated templates because form documents may have long lifetimes that are independent of their associated signature processes and/or templates. For example a form document (e.g., represented as a PDF file) may be transmitted via an email and stored for a period of time (e.g., a week or longer) before the signer signs the form. In the meantime, however, the signature process associated with the form document may have changed (e.g., to require additional information), resulting in an inconsistency between the originally transmitted form and the modified signature process.

Such problems with "stale" or inconsistent forms are avoided when using the presently described approach. In particular, because the ESS 100 uses a "late binding" approach that dynamically generates a form in response to a received request, modifications to the associated form template can be reflected in the generated form, even when the form template is modified after the URL is initially transmitted. In one embodiment, after transmitting the URL that identifies a template, the template may be modified, such as to include additional required electronic signature data. Then, in response to a received request, the ESS 100 prepares the form to include controls for receiving the additional required electronic signature data. Thus, even though the template was modified after transmission of the URL, the modified aspects of the template were still reflected in the prepared form transmitted to the client.

Figure 2:
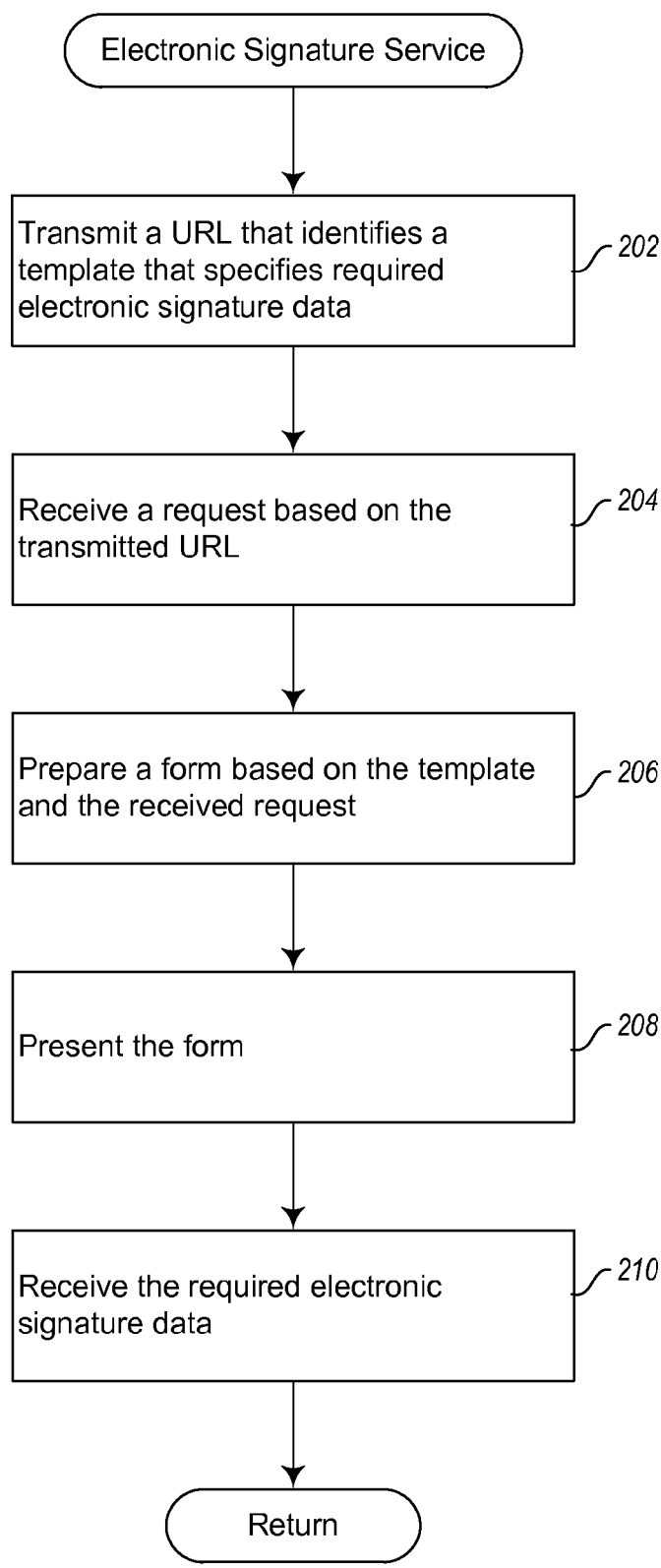
FIG. 2 is an exemplary flow diagram of an electronic signature service process performed by an embodiment of the present invention.

FIG. 2 is an exemplary flow diagram of an electronic signature service process performed by an embodiment of the present invention. In particular, FIG. 2 illustrates a process that may be implemented by, for example, one or more elements of the ESS 100, such as the logic 102, described with reference to FIG. 1. The process provides a dynamically generated form based on a received request that identifies a form template that specifies required electronic signature data.

The process begins at block 202, where it transmits a URL that identifies a template that specifies required electronic signature data. Typically, the transmitted URL is then embedded in a Web page or other document (e.g., email) that can be accessed on a client device for purposes of performing a transaction that requires an electronic signature.

At block 204, the process receives a request based on the transmitted URL. The received request may include one or more arguments or other data along with at least a portion of the transmitted URL. For example, a script or other code executing on a client device may have obtained information about a signer user, and included that information as arguments in the request, such as represented by a URL query string of one or more key value pairs.

At block 206, the process prepares a form based on the template and the received request. Preparing the form may include dynamically generating a form based on the template, where the form is populated to include arguments or other data that are part of the request received at block 204. The form may be represented, for example, as markup code (e.g., HTML code) and/or instructions (e.g., JavaScript instructions).

At block 208, the process presents the form. Presenting the form may include transmitting the form to a client device that is executing a Web browser. In other embodiments, other types of client applications may be utilized, such as a mobile application (e.g., an "app") executing on a smart phone. The Web browser then renders the transmitted form and receives the required signature data as user inputs to the form.

At block 210, the process receives the required electronic signature data. For example, the process may receive the required electronic signature data from a Web browser that is executing on a client device and that has rendered the form transmitted as described with respect to block 208. The Web browser may transmit the form data to the process in response to a user selection, such as selection of a "submit" button or other control. The received required electronic signature data may be stored or in some cases transmitted to one or more recipients specified by the template or another mechanism.

The process may perform other operations in addition to or instead of those described above. For example, in one embodiment, the process does not utilize, directly or indirectly, a PDF processing module during any of its operations. As another example, in some embodiments, the process may enforce usage restrictions specified by templates. For example, a usage restriction may specify a maximum number of times or frequency that a template can be used for electronic signature purposes. If the maximum number is exceeded, the process may refuse to prepare and transmit a form.

Figure 3:
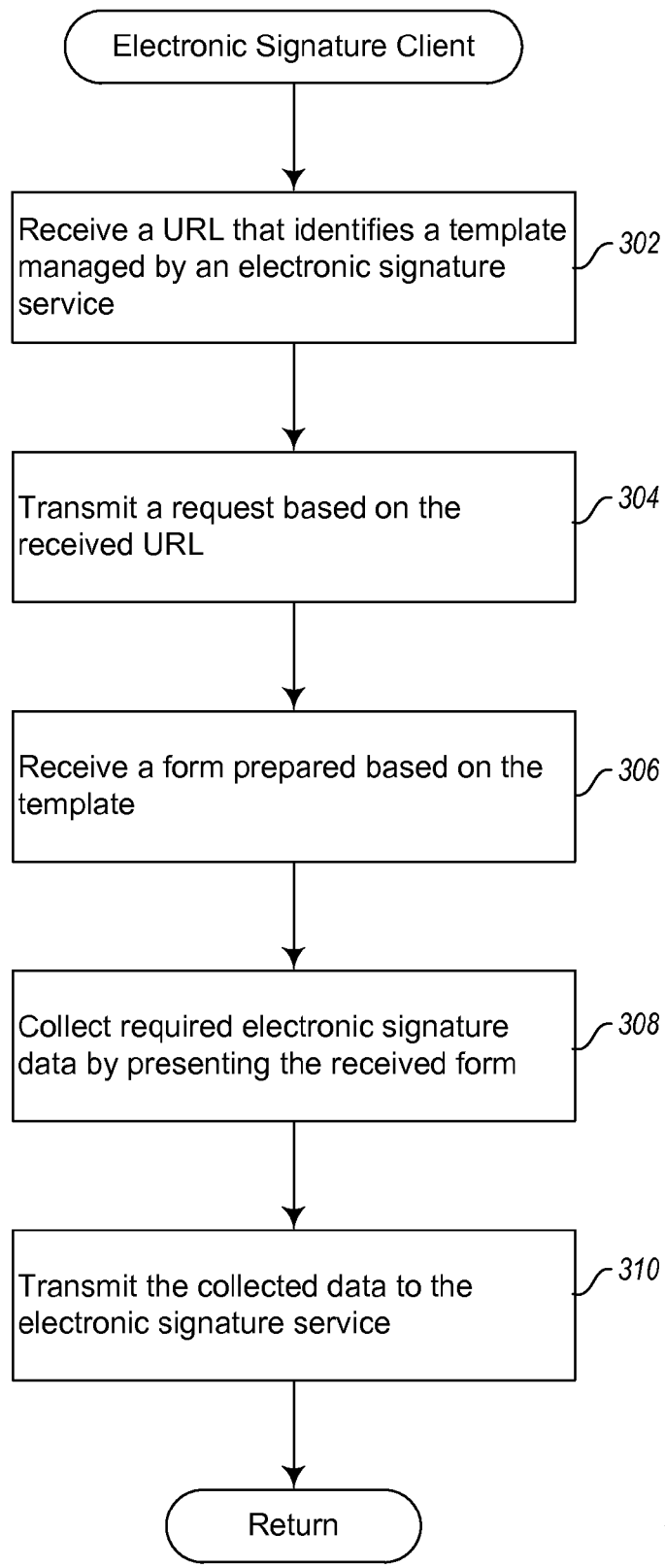
FIG. 3 is an exemplary flow diagram of an electronic signature client process performed by an embodiment of the present invention.

FIG. 3 is an exemplary flow diagram of an electronic signature client process performed by an embodiment of the present invention. In particular, FIG. 3 illustrates a process that may be implemented by or within a Web browser or other code module executing on the client device 121 described with respect to FIG. 1. The process interacts with an electronic signature service process (e.g., FIG. 2) in order to implement an electronic signature process.

The process begins at block 302, where it receives a URL that identifies a template managed or stored by an electronic signature service. The template specifies electronic signature data that is required to represent a complete electronic signature. In other embodiments, other mechanisms for identifying the template may be used, such as network file system file or resource identifiers.

At block 304, the process transmits a request based on the received URL. In some embodiments, the request is dynamically generated by the process based on the received URL and includes at least a portion of the received URL as well as other data or arguments. For example, the request may be generated by a script executing on a Web browser that has collected data values from a user. In generating the request, the script may incorporate the collected data values into the request, such as by appending them to the URL as a query string comprising one or more key value pairs. The request may be transmitted to the electronic signature service (e.g., using the HTTP protocol) in order to obtain a form for collecting required electronic signature data.

At block 306, the process receives a form prepared based on the template. As discussed above, the electronic signature service prepares a form based on the transmitted request. The prepared form is then transmitted from the electronic signature service to the illustrated process.

At block 308, the process collects required electronic signature data by presenting the received form. For example if the form is represented as HTML, the process may render the form in a Web browser or similar rendering component. Alternatively, the form may be represented as a code module (e.g., an applet or script). In such a case, the process presents the received form by executing or interpreting the code module. A user of the process can then use the presented form to input the required electronic signature data.

At block 310, the process transmits the collected electronic signature data to the electronic signature service. As discussed above, the electronic signature service then stores the electronic signature data for use or access by other users or system components.

Web Powerforms Embodiment

The following describes an exemplary embodiment referred to herein as the "Service," and based on Web POWERFORMS service offered by DocuSign, Inc. The Service facilitates the creation of an online-signing process, seamlessly integrated into a Web portal, intranet, email, document or other technology using only, in an embodiment, user interface tools. No programming is required to create this integrated experience.

The Service provides a user the ability to click a URL link, be placed in a form collecting their name and email address, and then be immediately placed in a Web user interface to complete a document signing. The Service further includes the ability for the technology to dynamically add the appropriate recipient information, place these data in the document to be signed, and present a customized, integrated document signing.

When the user clicks the URL link, a "virtual sender" initiates sending of a pre-described document. This allows the on-demand creation of a customized document for signature that is virtually prepared and sent in an automated fashion by the pre-specified sender.

Document signing can be directly embedded in a system that maintains the URL link. Also, in the Service, a template indicating parties, roles and order of document recipients describes the signing process. Furthermore, progress and status of a signing workflow is visible to the "virtual sender" from an online- or desktop-based console.

On completion of a document signing, results (e.g., signature data) are available for download by the virtual sender. Results and completed documents are also visible to the virtual sender via the console. Completed documents may be sent via email attachment to all parties.

Example Process According to an Embodiment

Step 1: Create a Template

Figure 4A:
FIGS. 4A-4N are user interface screens and controls provided by an exemplary embodiment of the present invention.

As illustrated in FIG. 4A, this step specifies the following: 1) the recipients of the document including the user initiating the document signing, 2) the signing order, 3) the subject and message, 4) security options and requirements, and 5) required data, signatures, initials, dates and other data to be collected in the signing process.

Step 2: Create a Web Form from the Template

As illustrated in FIG. 4B, the template created in Step 1 is identified as the instructions for a Web POWERFORMS form, referred to herein as a "Form." The virtual sender is identified, security options are specified and the method for signing is indicated. At the end of this step the Form exists for signing.

Step 3: Get Link from Form Library

As illustrated in FIGS. 4C and 4D, this step creates the URL link that can start the Form signing process. The URL extracted in this step can be inserted into a portal, intranet, email, document or other technology capable of launching a Web URL.

Step 4: Publish the Link for Users

The URL to the Form is added to a portal, intranet, email, document or other technology, such as is illustrated in FIG. 4E, which the user can access to start the signing process.

Step 5: User Clicks the Link and Activates the Form

As illustrated in FIG. 4F, clicking the Form link from the portal, intranet, email, document or other technology launches the signing process. The first step of the signing experience is to identify the user and any other required, un-addressed participants by supplying a name and email address.

Step 6: User Completes and Signs the Form

As illustrated in FIG. 4G, once the user and required parties are identified, the user is presented with the document, customized with the recipients, data and other content specified in the template in Step 1. The user adopts a signature, reviews the document, supplies the requested data, adds any required signatures and completes the signing.

Step 7: Data is Returned to the Electronic Signature Service and Made Available for Download After completion, all signing data, document and signing history are made available for download from the Forms Library. These data can be downloaded on a document basis or for all documents submitted on a specific Form.

Completed documents are delivered to all parties as attachments to the completion notification email as well as being made available in the console.

Web Based Forms

Overview

The Service allows users to create "self-help" transactions that do not require a send from an electronic signature service, such as may be provided by DocuSign, Inc. This is optionally advantageous for account openings, Web-based forms and documents sent via email. An embodiment does not require the user to have known software products, such as ADOBE ACROBAT Professional, and to know this software which is complex.

With the Service, Forms are made much more flexible by allowing a Form not to have a PDF that launches it. By converting a stored Template to a Form, the service generates some extra information about how the Form is to launch, etc., and the service can launch it with a URL. (This is similar to a PDF version, but the link is not to a PDF that starts the process, but rather it is directly to a template structure.)

The impact of this approach is to enable much more rapid deployment of Web-based signing for account openings, and other files, reducing cost and complexity for the customer, and removing the need for products such as ADOBE ACROBAT.

Features

The Service make a standard Template behave like a Form. In fact, the term Form may be used to describe all PDF-based or Web-based forms.

Attributes of a Form:

1) Can be invoked by a signer via a URL. This URL may be sent in an email, posted on a Web site, or embedded into a PDF document. The URL may be overloaded with data to populate the Form fields and to populate role information for recipients 2) Clicking the URL creates a new transaction and opens a secure browser to begin the signing process.

3) The signer who invokes the Form may provide any additional recipient data. In other words, if there are five signers in the Template workflow, the signer invoking the Form may default to being the first signer. They may provide information about who the other recipients are as part of their signing. This can occur up front, and may only happen if there is more than one undefined role. (This is different than the current PDF Form.)

4) Arguments may be able to be passed into the Form to provide information to complete form fields or assign roles. This allows an integration to collect HTML form information and generate a string with arguments to pre-populate the Form (e.g., name, email for each role, field values, access code, ID check, phone auth). (This is different than the way the current PDF POWERFORMS forms work.)

5) In general, in some prior approaches, templates are uploaded; there is no way to grab a template from a template library, etc. An embodiment is able to default to obtaining templates from the template library, not via uploading. If a user has the template in the library, the user can make a Form from it. If the template PDF has form fields, when the user creates a Form from it, the user can elect to use them or not by selecting PDF or Web as the type of Form he is creating. When the service creates a Form, the option to create "PDF" or "Web" Form can direct how it is constructed. If "PDF" is selected, the Form can have the hyperlink to begin signing in a PDF process, and the PDF data fields can be usable. If "Web" is selected, then it can go directly to the Web, and NOT use the PDF to collect data.

6) Attributes that can be edited:

a) Template. Opens the template for both PDF and Web Forms.

b) Sender. Assign who the Form is "owned" by—who it can report status back to, etc.

c) Usage settings. Maximum number of times it can be used and number remaining d) Frequency. How often it can be used; e.g., limit to every X minutes by the same signer.

e) Status. Active or inactive. If inactive, the link clicked may say "This document has been suspended and is not currently active. Please contact the sender."

f) Access Mode. Settings are Direct and Email. NOTE: When using Direct, the template may have some other form of authentication enabled such as access code, phone auth, or ID check to ensure the signer is identified. When the link is clicked, the Form opens immediately and processes as follows:

(1) Ask for any other recipients. If they are required, the recipients may be provided (e.g., name, email)

(2) Execute any authentication requested (3) Signing Process (4) Once complete, go to the URL for completed envelopes. An embodiment may add the URL for the completed signing event to be defined as part of the template.

g) Recipients. Optional edit of recipients that may also be accomplished in other "edit" modes. Some embodiments may display routing order, roles, etc.

h) PDF owner Password. This protects the ability to edit the PDF in the case of a PDF Form.

i) Document name j) Email Subject k) Email Text l) An embodiment may include Instructions. These instructions may be used on the starting page for the signer. If instructions are entered, this may be the "Introduction" shown after the signer clicks the URL. This may enable more hand-holding for the signer, and in the event the template has more than one role, it may be displayed on the same page as where the roles are asked for. This way, a user can define some text, such as "Welcome to Envoy Mortgage. You are applying for a loan. If you will be co-signing, please enter the name & email of the co-signer as well as your name and email."

m) If the Template contains Required Fields with the name "NAME" and "EMAIL" for the First Role, then the service may not ask the user to provide their name and email up front. The service can instead do it with the template.

7) Data Management a) It may be possible to download all the data collected by a Form by all its uses.

b) It may be possible to filter the download all the data by date range.

c) It may be possible to delete data collected by the Form, either all data, or by date range.

d) In a PDF Form, data from all PDF fields may be gathered. In a Form all data from SecureFields may be gathered. If a PDF has both PDF and Web SecureFields, all may be gathered.

e) Performance. It may be able to download 1000 records of 100 fields in 10 seconds. Other embodiments have different performance characteristics.

f) Format of CSV file. In an embodiment, each Form may have only one record/row in a CSV file vs. each having duplicate rows.

g) Form subject, signer name, signer email, date/time completed (or none if not complete), all field names in the PDF/SecureFields. For each signer the value they entered or the word "NA" if not assigned to that person.

8) Console listing a) The console listing Forms may have the following columns. They may be sortable, date searchable, and searchable by date used, sender, name, signing mode, status, type.

i) Name (Template name). Some embodiments compress "name" and "template" into one ii) Sender. Identity of who it is assigned to iii) Auth. Direct, email iv) Used. The number of records collected by the PDF. (This value changes if the user deletes records.)

v) Remaining The number left before the limit (if set) is hit vi) Last used date vii) Status (active, inactive)

viii) TYPE: PDF or Web b) Act on a Form. In the console the user may be able to use buttons or menus to do the following:

i) Get form data from one selected form (download data dialog)

ii) Download iii) Email. Creates email with hyperlink iv) Links. Displays the hyperlink for the Form v) Edit. Opens edit view vi) Template. Opens the template to be edited c) Create a new Form i) Not all templates are Forms. To make a Form, the user selects a template, and clicks "create Form" menu/button (1) This opens the "edit" panel for a Form, and allows the user to assign the "Form attributes"

(2) PDF or Web Form (3) Mode (4) Owner (5) Usage settings (6) Displays list of roles, and which are required or not (7) Email subject and Name (for subsequent signers)

ii) Difference between Template and Form (1) Forms have more attributes than Templates (2) Mode, Times uses, multiple data collection, etc.

Within the present invention, plan mappings and settings may be available as follows:

1) According to an embodiment:

a) Available to Standard and Enterprise Accounts b) Feature enabled as a plan item in the Billing Plan UI and the PlanItemsMaster table.

c) Service Admin can enable Forms d) User Admin can enable Forms, e.g., some users can use Forms, some can author them.

e) Users can turn on/off Forms

2) Launch for existing customers: normally this may be off

3) Launch for new customers: normally this may be on.

Docusign Powerforms Forms

DOCUSIGN POWERFORMS forms ("Forms") embody at least some of the described techniques and combine the capabilities of PDF forms and market-leading DocuSign, Inc. electronic signing and workflow technology. DocuSign, Inc. provides an example electronic signature service, sometimes referred to as the "System." Forms that were previously completed, signed and returned in hard copy via fax or overnight delivery can be widely distributed, conveniently completed and securely signed and returned electronically. Forms add these capabilities to existing editable PDFs:

Forms can be distributed via email or the Web with a unique, secure URL automatically generated by the System All data provided via the PDF form may be returned and preserved within the System and can be readily integrated into existing applications Centralized creation and management of Forms, including control of all workflow elements—authentications, approvals and routing order.

Forms work in conjunction with the System to allow a user to create transactions that do not require the user to send documents from the System.

In an embodiment, there are two types of Form users: Form Senders and Form Administrators.

Form Senders:

Form senders are allowed access to the Forms library and can download and send Forms that are assigned to as the Sender. Senders can also see completed, signed Forms that they sent, whether by email or other.

Form Administrators:

Form administrators have the same access as Form senders, but can also create and edit Forms. Additionally, Service administrators can extract the completed form data set, in XML or CSV format, from completed Forms.

Creating a Form

In an embodiment, only Service Administrators can create new Forms. If a user is not a Form Administrator, he or she may not use this section.

Creating a New Form

FIG. 4H shows a console configured to facilitate the creation of a new Form template.

1. The first step in creating a Form is creating a template. Follow the normal steps for creating a template. Templates that may be used for Forms preferably include only one document, although they can have any number of pages. When creating a template a user can use a PDF form created (or one that has been received from a third party) that has active form fields. The form fields are automatically converted to SecureFields when the PDF is added to a template. Once the template is created, the Form can now be created.

2. Go to the Manage Forms page Form tab in one of the following manners: (a) In the Console, click Forms and then click New Form. The user is taken to the Form tab on the Manage Forms page. (b) In the Console, click Forms and then click Forms Library. The user is taken to the Manage Forms page. Click the New Form link. (c) In the Console, click Forms and then click Forms Library. The user is taken to the Manage Forms page. Click the Form, tab.

3. Upload the template:

4. Click Template Library and locate the template.

5. To use a Professional template, click the "here" link, click Browse . . . and then locate the template. Professional templates have a file extension of .dpd and are located, by default, in My Documents\DocuSign Professional\Templates. In some embodiments, only one template may be uploaded per Form. Note: If a template used by a Form is edited and saved at a later time, the changes may be automatically reflected in the Form. Once a template is uploaded, the Recipients, Document Settings and Sender sections may be filled out with the information from the template.

6. Review template information. The information in the Document Settings and Sender section can be edited, but the information in the Recipients may be read-only and may be not editable. Any necessary changes to the recipients may be made in the template.

The Recipients section, shown in FIG. 4I, shows the routing order, recipient role or name, email address, recipient type (signer, certified delivery, carbon copy etc.), any access code associated with the recipient and if there is a security check (ID Check, Phone Authentication or False for no check) for the recipient.

Figure 4J:
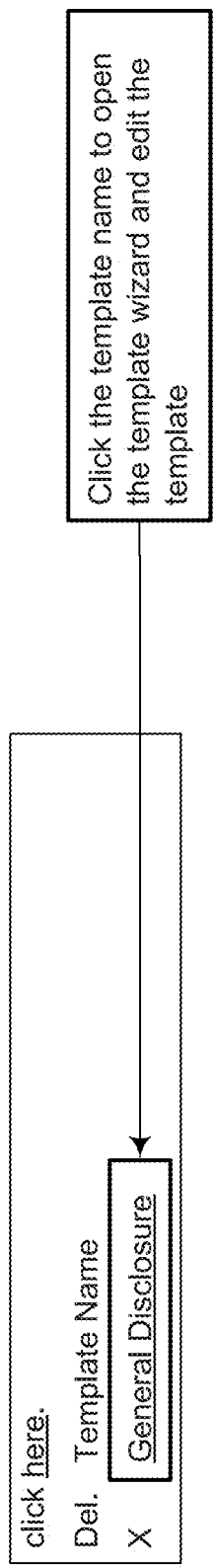

If any of this information is incorrect, the user can correct the template by clicking the template name link to open the template wizard, as illustrated in FIG. 4J. After saving the changes to the template, the user may be returned to the Form tab.

7. Review Sender information. The default sender for a Form may be the Form Administrator creating the Form. The sender associated with the Form may be the person that is notified by email when a Form is completed. The sender may be also the person who sees the Form-generated envelopes in the Sent Items folder in their Console.

Figure 4K:
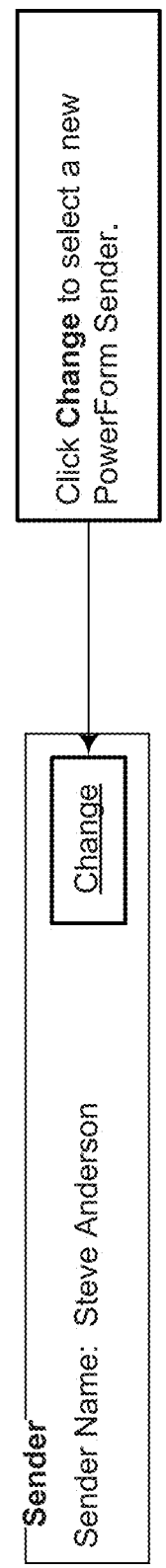

To change the Form sender, click the Change link to the right of the sender name, as illustrated in FIG. 4K. The list of all senders associated with the account appears. Select the sender and click Select to continue.

Note:

In one embodiment, only a single sender may be associated with the Form. If multiple senders need to be associated with a Form, create multiple copies of the Form (one copy for each sender) and associate the sender with the Form.

Figure 4L:

8. Set the Usage Settings, as illustrated in FIG. 4L:

Maximum number of times the document can be used: The Form administrator can specify the number of times the Form can be used (signed). This can limit an account's exposure to excessive envelopes usage by specifying a maximum number of times the Form can be used. A Form administrator can edit this number anytime after the Form is created, even if it has reached a previously entered use limit. Each time a recipient clicks Begin Signing for a document, the number of Uses remaining may be reduced by one. If a recipient attempts to sign a Form that has reached its maximum number of uses, an error message may be displayed to the recipient saying the document is not available for signing.

Frequency the same signer can use the document: The Form administrator can specify how often the same recipient can sign the same Form. This may be accomplished by specifying a length of time between signings. For example, if a Form is configured to limit use to every 365 days, then the same recipient may only be able to sign the Form once every year. If the recipient attempts to sign the Form more frequently than allowed, an error message may be displayed to the recipient saying the document is not available for signing.

Document Status: This sets whether a document can be sent to recipients. The default status for a Form may be Active, meaning the Form can be sent and signed by recipients. If the status is changed to Inactive, then the Form may not be emailed or accessed by a recipient (even if they are entering the Form URL or HTML link). If a recipient attempts to sign an inactive Form, an error message may be displayed to the recipient saying the document is not active and to contact the sender.

Signing Mode: In an embodiment, the Service supports two types of signing modes: Email and Direct.

The Email signing mode may be used to verify the recipient's identity using email authentication before they can sign a document. After a recipient enters their email and clicks Begin Signing, an email with a validation code for the Form may be sent to the recipient. If the recipient did not provide a valid email address, they may not be able to open and sign the document.

The Email signing mode can also be used if someone other than the recipient will be completing the Form. For example, a call center representative completes the Form while they are on the phone with the signer and provides the signer's name and email address in the Form. When the representative clicks Begin Signing, the recipient receives an email notification to sign the document and they are not able to edit the information entered into the Form by the representative.

The Direct signing mode does not require any verification. After a recipient enters their email and clicks Begin Signing, a new browser opens and the recipient can immediately begin the signing process.

Since the recipient's identity is not verified using email authentication, it is strongly recommended that the Direct signing mode only be used when the Form is accessible behind a secure portal where the recipient's identity is already authenticated or another form of authentication (for example: access code, phone authentication or ID check) is specified for the recipient in the template.

9. Review and set the Document Settings, as illustrated in FIG. 4M:

Document Name: This may be a required field. This is the name of the Form. The default name of the Form may be the template name.

Email Subject: This may be a required field. This is the email subject for any emails sent with this Form. The default email subject may be the Message subject from the template.

Email Text: This may be a required field. And text is provided for the Form. This text may be used in emails sent to signers who are notified via email.

Signing Instructions: These may be additional instructions that are shown on the starting page for the recipient. These instructions are optionally advantageous if the recipient accesses the Form by a method other than email. If instructions are entered, they may be shown as an introduction after the recipient accesses the Form.

10. Save the Form. After adding the template and making adjustments to the settings for the Form, click Save to save the Form. The user is then returned to the Forms Library tab and the new Form is listed in the Forms Library. To exit the Form tab without saving the Form, click the Form Library tab.

Sending Forms

In an embodiment, there are multiple ways that a Form can be sent to a recipient, but sending process typically begins by viewing the Forms Library.

Form administrators can see all Forms for all senders in their account. Form Senders may only see the Forms for which they are the sender. This is a form of access control that restricts Form Senders to only the Forms they are allowed to use.

The Forms in the library can be sorted by clicking on the column headings. Forms can also be searched based on various criteria, for example, by date last used/signed, document name, sender name, signing mode, or status.

Forms can be sent by email or by using a URL link or HTML settings or by setting them up embedded in a Web page.

Sending by Email

1. In the Console, click Forms and then click Forms Library. The user is taken to the Manage Forms page Forms Library tab.

2. Select the Form to send by clicking the check box adjacent to the Form name.

3. Click Email, a new email is opened using a default email client. The Email Subject and Text from the Form is automatically entered in the email and the URL link to the Form is added at the end of the email text. The user can review and edit the subject text for the email.

4. Send the email.

Sending by Attachment

This is similar to sending a Form by email, but in this case the Form is attached to an email rather than being linked from it. Note: In an embodiment, this method may only be used if the Form type is PDF.

1. In the Console, click Forms and then click Forms Library. The user is taken to the Manage Forms page Forms Library tab.

2. Select the Form to send as an attachment by clicking the check box adjacent to the Form name.

3. Click Download and save the Form to the user's system.

4. Create a new email using an email client and attach the Form to the email.

5. Fill out and send the email normally.

Sending by URL

1. In the Console, click Forms and then click Forms Library. The user is taken to the Manage Forms page Forms Library tab.

2. Select the Form to send by clicking the check box adjacent to the Form name.

3. Click Links, a dialog box is displayed with a URL link to the Form and HTML snippet. The user can copy and paste the URL in an email or the user can copy the HTML snippet and add it to a Web page.

Forms Library

The Forms Library provides a common location for storing and accessing Forms.

Form administrators can see all Forms for all senders in their account. Form Senders may only see the Forms for which they are the sender. This is a form of access control that restricts Form Senders to only the Forms they are allowed to use.

Viewing the Forms Library

When a Service administrator and users view their Library, they may see the following information for each Form:

Name (Template)—the Form name and template name

Sender—the sender associated with the Form

Auth—the Signing Mode (Email/Direct) for the Form

Used—the number of times the Form has been used

Remaining—the remaining number of times the Form can be used

Last Used—the date the Form was last sent or signed

Status—if the Form is Active or Inactive

Type—the type of document in the Form: PDF indicates the source of the Form is a PDF file with active form fields, Web indicates the source of the Form is a template.

The Forms Library list can be sorted by clicking on the column headings. The Forms Library can also be searched by date last used/signed, document name, sender name, signing mode, or status.

Retrieving Form Data

If the Form has been signed, a Form administrator can download the form data for the Form, as follows:

1. From the Forms Library tab, select the Form to download data from by clicking the check box adjacent to the Form name and click Form Data the Form Data dialog box appears.

Figure 4N:
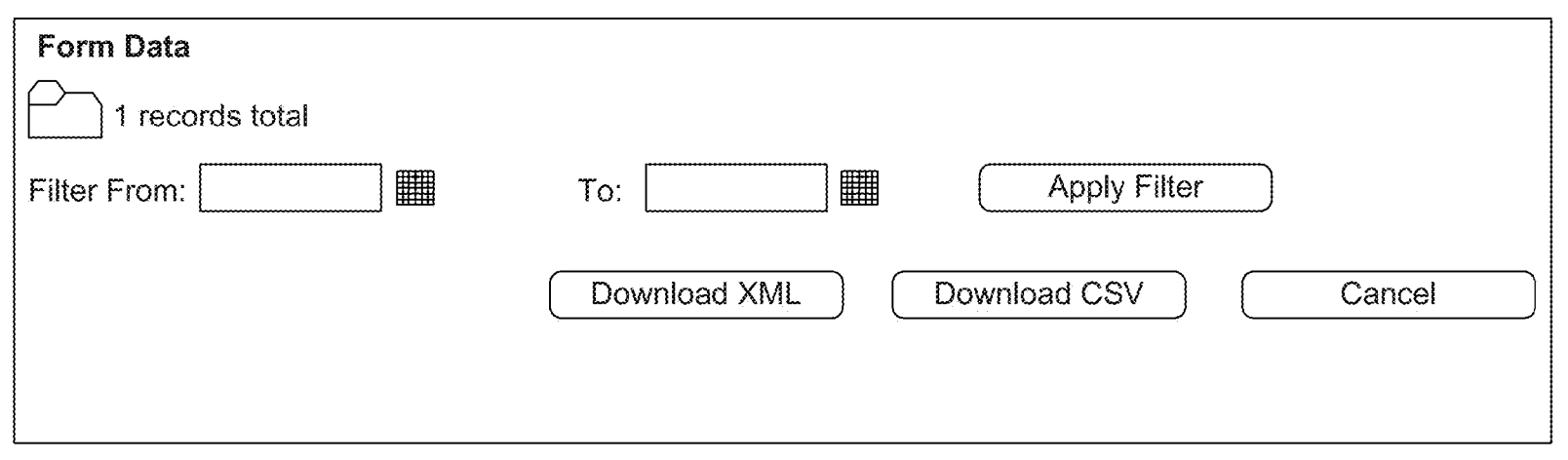

2. Optionally, filter by selecting a From and To date range. After entering or selecting the date range, click Apply Filter to apply the date range filter, as shown in FIG. 4N.

3. Click Download XML or Download CSV to download the information as an XML or CSV file.

Editing a Form

Form administrators can edit a Form at any time. When editing a Form the Form administrator can replace or edit the template associated with the Form, change the document and usage settings and change the sender for the Form.

1. From the Forms Library tab, Select the Form to edit by clicking the check box adjacent to the Form name and click Edit. The Form tab with the Form information is displayed.

2. Edit the Form information in the same manner as creating a new Form.

3. Click Save to save changes.

Replacing a Form Template

If the administrator wants to update the template associated with the Form, they can do so by clicking on the template file name and downloading the template to their local machine. They can then edit the template and then upload the new template.

1. From the Forms Library tab, select the Form to replace the template for by clicking the check box adjacent to the Form name (the user can select multiple Forms in the list) and click Replace Template the Template Selection dialog box appears.

2. Select a new template for the Form and click Save.

3. Click Save to save the change.

When a new template is uploaded for the Form, all signers who have an older version of the Form will be presented with the updated PDF document to sign and will be processed based on the updated template (e.g., modified authentication methods, routing orders, etc.). Note: If the underlying PDF document is replaced, the administrator making the change may need to make sure the new version has the same fields (and field names) as the old version or the Form may fail.

Copying a Form

A Form administrator can create multiple copies of a Form for the purposes of assigning the Form to different senders. A unique copy of the Form will be created for each sender.

1. From the Forms Library tab, select the Form to copy by clicking the check box adjacent to the Form name (the user can select multiple Forms in the list) and click Copy, the list of all senders associated with the account appears.

2. Select the sender and click Select to continue.

3. Click Save to save the change.

Deleting a Form

Administrators can delete Forms from the Form Library. However, any data associated with the Form may be lost when the Form is deleted. If the user wants to retain the Form data, the user can retrieve and save the data or just set the Form status to Inactive.

1. From the Form Library tab, select the Form to delete by clicking the check box adjacent to the Form name (the user can select multiple Forms in the list) and click Delete, the system asks for confirmation of the deletion of the Form.

2. Click OK to delete the Form or Cancel to cancel the action.

Embedding a Form in a Web Page

The user can select the appropriate Form within the library and click on the "Links" button. A dialog will be displayed with a URL link to the Form and HTML snippet. The user can copy and paste the URL in an email or the user can copy the HTML snippet and add it to a Web page.

Example Computing System

Figure 5:
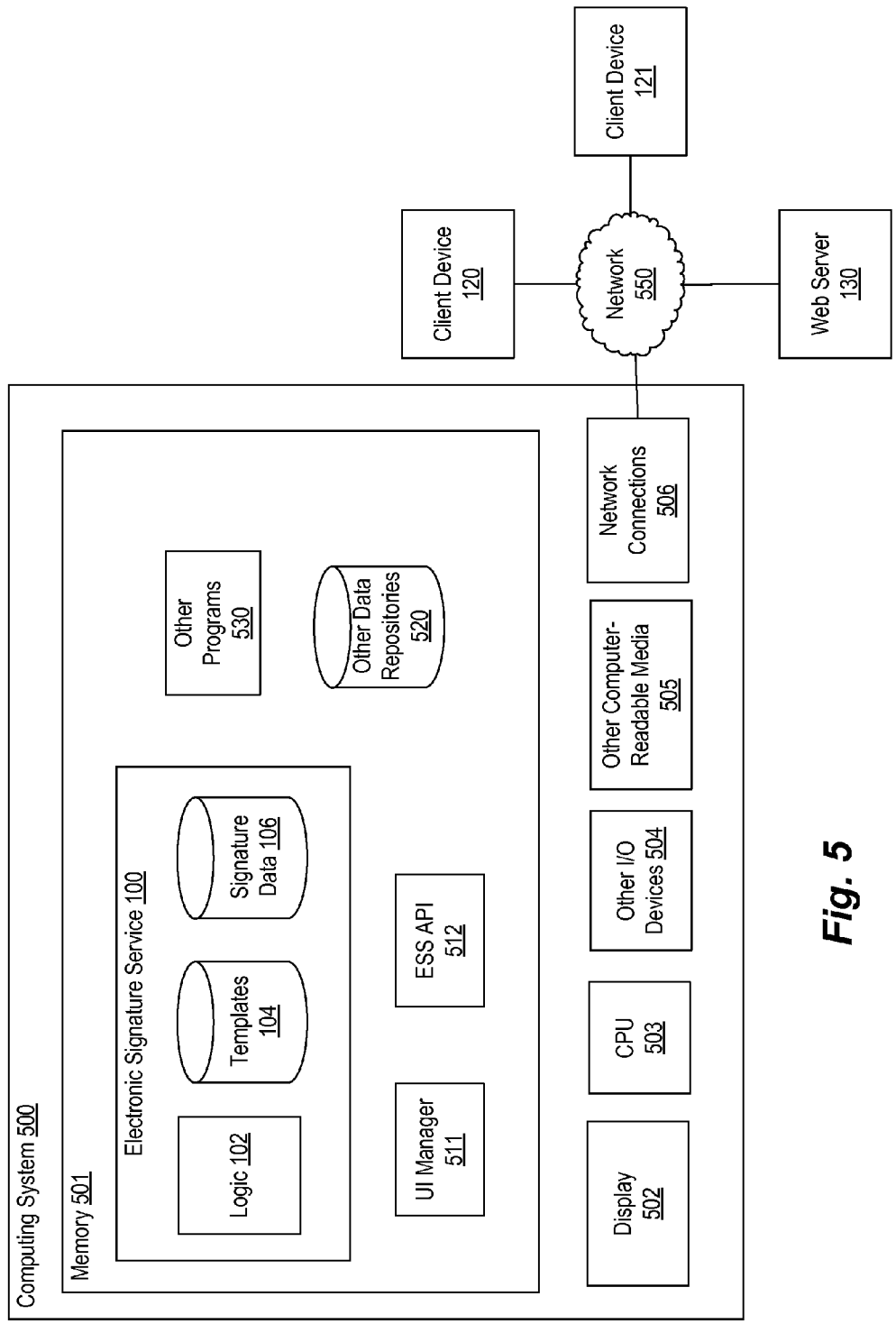
FIG. 5 is a block diagram of a computing system for practicing exemplary embodiments.

FIG. 5 is a block diagram of a computing system for practicing example embodiments of an electronic signature service 100. In the embodiment shown, the computing system 500 comprises a computer memory ("memory") 501, a display 502, one or more Central Processing Units ("CPU") 503, Input/Output ("I/O") devices 504 (e.g., audio processor, video processor, keyboard, mouse, CRT or LCD display cards or drivers, and the like), other computer-readable media 505, and network connections 506.

The electronic signature service 100 is shown residing in memory 501. The electronic signature service 100 interacts with client devices 120-121 and the Web server 130 via a network 550. In other embodiments, some portion of the contents and some of or all of the components of the electronic signature service 100 may be stored on and/or transmitted over the other computer-readable media 505. The components of the electronic signature service 100 preferably execute on one or more CPUs 503 to manage electronic signature processes, as described herein. Other code or programs 530 (e.g., a Web browser or server, and the like) and potentially other data repositories, such as data repository 520, also reside in the memory 501, and preferably execute on one or more CPUs 503. Of note, one or more of the components in FIG. 5 may not be present in any specific implementation. For example, some embodiments may not provide other computer-readable media 505 or a display 502.

The memory 501 also includes a user interface manager 511 and an electronic signature service application program interface ("API") 512. The user interface ("UI") manager 511 provides a view and a controller that facilitate user interaction with the electronic signature service 100 and its various components. For example, the user interface manager 511 provides interactive graphical user interface elements such as those described with respect to FIGS. 4A-4N. As discussed, such user interfaces allow users to create and manage templates that represent electronic signature processes.

The API 512 provides programmatic access to one or more functions of the electronic signature service 100. For example, the API 512 may provide a programmatic interface to one or more functions of the electronic signature service 100 that may be invoked by one of the other programs 530 or some other module. In this manner, the API 512 facilitates the development of third-party software, such as user interfaces, plug-ins, news feeds, adapters (e.g., for integrating functions of the electronic signature service 100 into Web or mobile applications), and the like. In addition, the API 512 may be in at least some embodiments invoked or otherwise accessed via remote entities, such as by code executing on a remote client device, to access various functions of the electronic signature service 100. For example, an application on the client device 121 may upload signature data via the API 512. The API 512 may also be configured to provide code modules that can be integrated into third-party applications and that are configured to interact with the electronic signature service 100 to make at least some of the described functionality available within the context of other applications.

In an example embodiment, components/modules of the electronic signature service 100 are implemented using standard programming techniques. For example, the electronic signature service 100 may be implemented as a "native" executable running on the CPU 503, along with one or more static or dynamic libraries. In other embodiments, the electronic signature service 100 may be implemented as instructions processed by a virtual machine that executes as one of the other programs 530. In general, a range of programming languages known in the art may be employed for implementing such example embodiments.

In addition, the embodiments described above may also be structured in various ways, including but not limited to, multiprogramming, multithreading, client-server, or peer-to-peer, running on one or more computer systems each having one or more CPUs. Some embodiments may execute concurrently and asynchronously, and communicate using message passing, pipes, signals, or other communication techniques. Also, other functions could be implemented and/or performed by each component/module, and in different orders, and by different components/modules, yet still achieve the described techniques.

Furthermore, in some embodiments, some or all of the components of the electronic signature service 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be non-transitorily stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may include or be implemented in a variety of computer-readable media. Computer-readable media can be any available media that can be accessed by a computer and includes both volatile and non-volatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

Embodiments of the invention may include or otherwise be implemented according to elements described in co-pending and commonly owned U.S. application Ser. No. 12/176,265 filed Jul. 18, 2008, which is hereby incorporated by reference as if fully set forth herein.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

While the preferred embodiment of the invention has been illustrated and described, as noted above, many changes can be made without departing from the spirit and scope of the invention. Accordingly, the scope of the invention is not limited by the disclosure of the preferred embodiment.

The invention claimed is:

1. A method in an electronic signature service, comprising:
creating a template that specifies required electronic signature data and that specifies usage restrictions that specify a maximum number of electronic signatures that can be collected via the template;
transmitting a URL that identifies the template;
receiving a request based on the transmitted URL;
enforcing the usage restrictions;
determining a number of uses for the template;
in response to the received request, and when it is determined, based on the determined number of uses, that the maximum number of electronic signatures specified by the usage restrictions has not been reached,
preparing a form based on the template;
presenting the form within a Web browser; and
receiving the required electronic signature data; and
in response to the received request, and when it is determined, based on the determined number of uses, that the maximum number of electronic signatures specified by the usage restrictions has been reached,
presenting an error message indicating that the form is not available for signing; and
refusing to prepare and transmit a form based on the template,
wherein the usage restrictions further specify a maximum frequency that the template can be used for electronic signature purposes, the maximum frequency specifying a length of time between signings, wherein a recipient may only sign the form once within the specified length of time.

2. The method of claim 1 wherein the received request includes one or more arguments along with a portion of the transmitted URL, and wherein preparing the form includes populating the form with the included arguments.

3. The method of claim 1 wherein the request is based on a URL that includes argument values received from data collection performed by a client device that executes the Web browser.

4. The method of claim 1, further comprising:
after transmitting the URL that identifies the template, modifying the template to include additional required electronic signature data; and
in response to the received request, preparing the form to include controls for receiving the additional required electronic signature data.

5. The method of claim 1, presenting a user interface for managing electronic signature templates, the user interface configured to:
provide access to a library of templates that provides a common location for storing and accessing templates;
create a template based on a template from the library; and
specify usage restrictions via controls for specifying a maximum number of electronic signatures that can be collected via the template.

6. The method of claim 5 wherein the user interface is further configured to specify both an email signing mode and direct signing mode, wherein the email signing mode requires email authentication before a signer can provide an electronic signature, wherein the direct signing mode does not require email authentication before a signer can provide an electronic signature.

7. The method of claim 5, further comprising:
specifying, via the user interface, that the template is in inactive status; and
receiving a second request based on the URL,
in response to the inactive status and the received second request,
presenting an error message indicating that the form is not available for signing; and
refusing to prepare and transmit a form based on the template.

8. The method of claim 1, further comprising transmitting the form as an attachment to an email.

9. The method of claim 1, wherein the template further specifies a status that indicates that the template is active or inactive, wherein the template further specifies a direct signing mode or an email signing mode, wherein the email signing mode requires email authentication before a signer can provide an electronic signature, and wherein the direct signing mode does not require email authentication before a signer can provide an electronic signature.

10. The method of claim 1, wherein the form is configured, when opened, to request names or email address of other recipients.

11. A system comprising:
an electronic signature service computer that includes a processor and a memory and that is configured to:
transmit a URL that identifies a template that specifies required electronic signature data and that specifies usage restrictions that specify a maximum number of electronic signatures that can be collected via the template;
receive a request based on the transmitted URL;
enforce the usage restrictions;
determining a number of uses for the template;
in response to the received request, and when it is determined, based on the determined number of uses, that the maximum number of electronic signatures specified by the usage restrictions has not been reached,
prepare a form based on the template; present the form within a Web browser; and
receive the required electronic signature data; and
in response to the received request, and when it is determined, based on the determined number of uses, that the maximum number of electronic signatures specified by the usage restrictions has been reached,
presenting an error message indicating that the form is not available for signing; and
refusing to prepare and transmit a form based on the template,
wherein the usage restrictions further specify a maximum frequency that the template can be used for electronic signature purposes, the maximum frequency specifying a length of time between signings, wherein a recipient may only sign the form once within the specified length of time.

12. The system of claim 11 wherein the transmitted URL is included in a Web site accessed by the Web browser.

13. The system of claim 11, wherein the electronic signature service computer is further configured to transmit the received electronic signature data to one or more recipients specified by the template.

14. The system of claim 11, further comprising:
a client device that is remote from the electronic signature service computer, that executes the Web browser and that is configured to:
receive the transmitted URL;
dynamically generate the request based on the transmitted URL, by including one or more arguments in the generated request; and
transmit the request to the electronic signature service computer,
wherein the electronic signature service computer is further configured to prepare the form based on the template by populating the form with the included arguments.

15. The system of claim 14, wherein the client device is further configured to execute a module in the Web browser that dynamically generates the request based on the transmitted URL.

16. The system of claim 14 wherein the client device is further configured to:
collect data values from a user of the client device; and
include the collected data values as the one or more arguments in the generated request.

17. A non-transitory computer-readable medium that includes instructions configured, when executed an electronic signature service computing system, to perform a method comprising:
transmitting a URL that identifies a template, created via the user interface, that specifies required electronic signature data and that specifies usage restrictions that specify a maximum number of electronic signatures that can be collected via the template;
receiving a request based on the transmitted URL;
enforcing the usage restrictions;
determining a number of uses for the template;
in response to the received request, and when it is determined, based on the determined number of uses, that the maximum number of electronic signatures specified by the usage restrictions has not been reached,
preparing a form prepared based on the template;
presenting the form within a Web browser executing on a remote client device; and
receiving the required the electronic signature data; and
in response to the received request, and when it is determined, based on the determined number of uses, that the maximum number of electronic signatures specified by the usage restrictions has been reached,
presenting an error message indicating that the form is not available for signing; and
refusing to prepare and transmit a form based on the template,
wherein the usage restrictions further specify a maximum frequency that the template can be used for electronic signature purposes, the maximum frequency specifying a length of time between signings, wherein a recipient may only sign the form once within the specified length of time.

18. The non-transitory computer-readable medium of claim 17, wherein method further comprises executing a module in the Web browser that dynamically generates the request based on the transmitted URL, wherein the module is a script executing in the Web browser.

19. The non-transitory computer-readable medium of claim 17 wherein the method further comprises:
collecting data values from a user of the client device; and
including the collected data values as the one or more arguments in the generated request.

* * * * *